Dec. 21, 1926.
L. J. WOGENSTAHL
1,611,259
BATTERY FILLER
Filed March 18, 1925
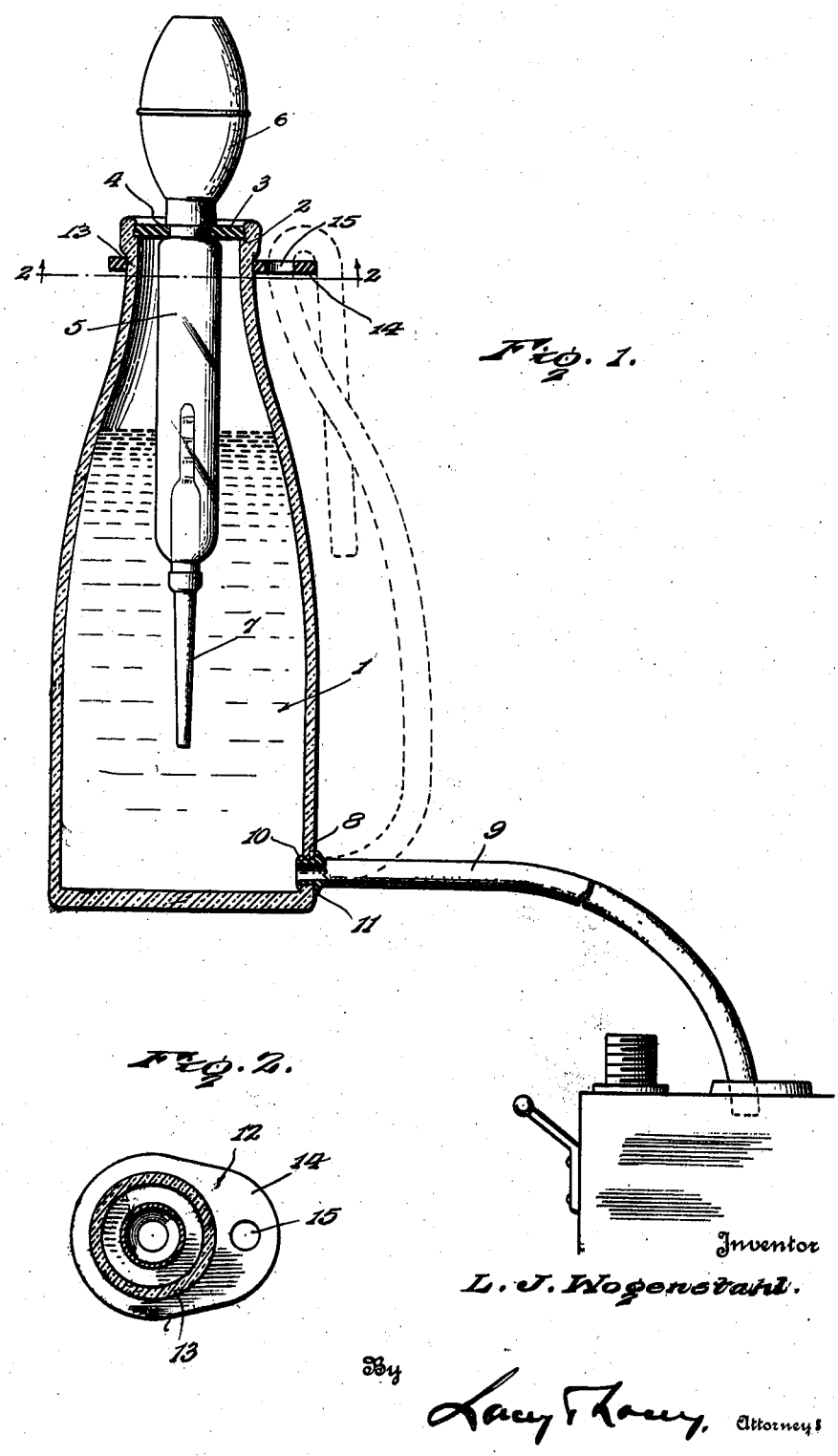

Patented Dec. 21, 1926.

1,611,259

UNITED STATES PATENT OFFICE.

LEO J. WOGENSTAHL, OF CINCINNATI, OHIO.

BATTERY FILLER.

Application filed March 18, 1925. Serial No. 16,487.

This invention relates to improvements in devices for supplying distilled water to storage battery cells. Considerable difficulty is often experienced by users of storage batteries in supplying distilled water to the batteries for if a funnel is not handy, the water is liable to be spilled over the top of the battery and must be wiped off, and, furthermore, it is difficult, even with the use of a funnel, to properly regulate the amount of water supplied so that frequently too great a quantity of water is added to one or more of the cells of the battery. Therefore, it is one of the objects of the present invention to provide a device by the use of which water may be supplied to the cells of a storage battery without any likelihood of spilling any of the water upon the top of the battery and in a manner to permit of the supply being immediately arrested when the proper water level has been reached.

Another important object of the invention is to provide a device for supplying distilled water to storage batteries which device will constitute a convenient container for the distilled water and will be so sealed as to prevent evaporation and, at the same time, the device is so constructed that it may be instantly brought into use.

Another important object of the invention is to provide a device for supplying distilled water to storage batteries so constructed that it will constitute also a support and container for the hydrometer employed in testing the battery so that the rubber nozzle of the hydrometer will not become fouled with dirt but will be at all times kept clean and the hydrometer as a whole will be kept in a cleanly condition and, being directly associated with the distilled water container of the device, will be immediately available for use in testing the battery before supplying water thereto.

In the accompanying drawings:

Figure 1 is a view partly in section and partly in side elevation illustrating the device embodying the invention, the supply tube of the device being shown in full lines leading to a battery to be supplied with distilled water and in dotted lines in the position which it will normally occupy when not in use.

Figure 2 is a horizontal sectional view taken substantially on the line 2—2 of Figure 1, looking in the direction indicated by the arrows.

The device embodying the invention comprises a distilled water container indicated in general by the numeral 1, and this container may be in the form of a glass or earthenware jar of any desired capacity and provided preferably with a shoulder 2 located circumferentially within its relatively wide mouth. The mouth of the container will normally be closed by a circular washer 3 of rubber and this washer is provided centrally with an opening 4 to which the upper end of the tube 5 of a hydrometer including, in addition to the tube, the usual rubber bulb 6 and rubber nozzle 7, it being observed by reference to Figure 1 of the drawings, that when not in use, the hydrometer is supported in an upright position by the washer 3, with its tube 5 and rubber nozzle 7 extending downwardly into the container 1 and more or less immersed in the distilled water in the container. It will also be observed that the washer 3 constitutes a closure for the container and that, being of rubber, it serves to close the container in an air-tight manner.

In accordance with the present invention, the container 1 is formed in one side, substantially at its bottom, with an opening 8, and one end of a rubber tube 9 is fitted in this opening. Preferably, the hose or tube will be provided with spaced circumferential ribs 10 and 11, thus adapting the end of the tube to be more or less securely and permanently connected with the container 1, within the opening 8, and likewise providing a water-tight connection between the hose or tube and the container. In order that the discharge end of the flexible tube 9 may be normally supported in an elevated position so as to not only prevent delivery of water from the container through the tube, but also to prevent this end of the tube becoming fouled with dirt and dust, a supporting member indicated by the numeral 12, is provided and this member is preferably in the nature of a flat disc-like body of medium soft rubber formed with an opening 13 adapting the body to be fitted frictionally about the mouth of the container 1. The said body 12 of the supporting member is of approximately elliptical outline and the opening 13 is located nearer the major end of the body and substantially concentric thereto so that the minor end of the body projects a short distance beyond the outer surface of the mouth of the container 1 to provide a supporting lip indicated by the numeral 14. This lip 14 is formed with an opening 15 which is of a diameter to more or less snugly receive the rubber tubing 9 and it will be observed by reference to Figure 1 of the drawings, that when the tubing is not in use to drain water from the container 1, its delivery end portion may be inserted through the opening 15 in an upward direction and then permitted to hang downwardly over the edge of the lip 14, the tubing being, in this manner, supported in an elevated position and out of contact with the shelf or floor upon which the container may be disposed. It will be understood at this point that when the tubing 9 is engaged with the supporting member 12, no water will flow through the tubing as the water level within the tubing will be the same as in the container. However, when it is desired to draw water from the container and deliver the same to a battery to be supplied with water, the discharge or delivery end of the tubing is slipped through the opening 15 and the tubing is pinched near its end and then has its said end inserted into the filling opening in the top of the cell to be supplied with water. When the tube is relieved of pressure, water will, of course, flow from the container through the tube and into the cell and when the proper level has been reached in the cell, the tubing is again pinched and its delivery end inserted into the next cell, and so on, until all of the cells of the battery have been supplied with water, after which the tubing is again fitted through the opening 15 until required at some future period.

It will be evident from the foregoing, that the present invention contemplates a decidedly compact and advantageous arrangement of parts by which a distilled water container for use in connection with storage batteries is provided and it will, furthermore, be evident that the hydrometer or battery tester is associated with the container of the device in such a manner that the supporting means for the tester constitutes an air-tight closure for the container and thus serves to prevent the evaporation of the distilled water, at the same time supporting the hydrometer in a position where it is available for the purpose of testing the battery fluid before supplying water to the battery.

Having thus described the invention, what I claim is:

A device for supplying distilled water to storage battery cells, said device comprising a container open at its upper end and including a bottom and a cylindrical wall having its upper portion tapered and terminating in an outstanding annular shoulder about the open upper end of the container, the wall being formed with a lateral opening adjacent said bottom, an elongated flat elastic body having a small opening in one end and a larger opening in the opposite end to be sprung over the outstanding shoulder at the upper end of the container and fit upon the tapered upper end portion of the container in close gripping engagement therewith adjacent the lower edge of said shoulder, and a flexible tube having one end fitted into the lateral opening of the container and its free end portion adapted to be passed through the small opening of the elastic body whereby the tube may be releasably retained in on elevated position when the device is not in active service.

In testimony whereof I affix my signature.

LEO J. WOGENSTAHL. [L. S.]